(12) United States Patent
Alarcon

(10) Patent No.: US 10,227,884 B2
(45) Date of Patent: Mar. 12, 2019

(54) FAN PLATFORM WITH LEADING EDGE TAB

(71) Applicant: UNITED TECHNOLOGIES CORPORATION, Hartford, CT (US)

(72) Inventor: Andrew G. Alarcon, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 267 days.

(21) Appl. No.: 14/909,471

(22) PCT Filed: Aug. 6, 2014

(86) PCT No.: PCT/US2014/049847
§ 371 (c)(1),
(2) Date: Feb. 2, 2016

(87) PCT Pub. No.: WO2015/053848
PCT Pub. Date: Apr. 16, 2015

(65) Prior Publication Data
US 2016/0194973 A1    Jul. 7, 2016

Related U.S. Application Data

(60) Provisional application No. 61/879,254, filed on Sep. 18, 2013.

(51) Int. Cl.
*F01D 11/00* (2006.01)
*F02K 3/06* (2006.01)
*F01D 5/30* (2006.01)
*F01D 5/02* (2006.01)

(52) U.S. Cl.
CPC .............. *F01D 11/008* (2013.01); *F01D 5/02* (2013.01); *F01D 5/3007* (2013.01); *F02K 3/06* (2013.01);
(Continued)

(58) Field of Classification Search
CPC ... F01D 5/02; F01D 5/147; F01D 5/30; F01D 5/3007; F01D 5/3023; F01D 5/303;
(Continued)

(56) References Cited

U.S. PATENT DOCUMENTS 3,801,222 A      4/1974  Violette
4,621,979 A  *  11/1986  Zipps ..................... F01D 5/141
                                                  416/190
(Continued)

FOREIGN PATENT DOCUMENTS

EP            2312125 A1    4/2011

OTHER PUBLICATIONS

International Preliminary Report on Patentability for International Application No. PCT/US2014/049847 dated Mar. 31, 2016.
(Continued)

*Primary Examiner* — David E Sosnowski
*Assistant Examiner* — Sang K Kim
(74) *Attorney, Agent, or Firm* — Carlson, Gaskey & Olds, P.C.

(57) ABSTRACT

A platform for a gas turbine engine has an outer surface and an inner surface. The inner surface is provided with a mount location for mounting the platform to a rotor. The platform extends from a leading edge to a trailing edge, and between a suction wall and a pressure wall. A circumferential direction is defined between the suction wall and the pressure wall. A tab extend circumferentially outward of one of the suction and pressure walls from the platform. The tab has a circumferentially outermost portion which will abut an inner surface of an adjacent platform when the platform is mounted. A fan section and a gas turbine engine are also disclosed.

20 Claims, 4 Drawing Sheets

(52) U.S. Cl.
CPC ...... *F05D 2220/32* (2013.01); *F05D 2240/80* (2013.01); *Y02T 50/672* (2013.01); *Y02T 50/673* (2013.01)

(58) Field of Classification Search
CPC ........ F01D 5/3038; F01D 5/3046; F01D 5/32; F01D 5/323; F01D 5/326; F01D 11/008; F02K 3/06; F05B 2220/32; F05B 2240/80; Y02T 50/672; Y02T 50/673
See application file for complete search history.

(56) References Cited

U.S. PATENT DOCUMENTS

| | | | |
|---|---|---|---|
| 5,466,125 | A | 11/1995 | Knott |
| 7,811,053 | B2* | 10/2010 | Balamucki ................ F01D 5/10 |
| | | | 415/173.1 |
| 2008/0226458 | A1 | 9/2008 | Pierrot et al. |
| 2008/0286106 | A1* | 11/2008 | Keith ..................... F01D 5/147 |
| | | | 416/193 A |
| 2011/0038734 | A1 | 2/2011 | Marra |
| 2011/0146299 | A1 | 6/2011 | Hoyland et al. |
| 2013/0064667 | A1 | 3/2013 | Campbell et al. |

OTHER PUBLICATIONS

Supplementary European Search Report for European Application No. 14852016.6 dated Sep. 7, 2016.
International Search Report from corresponding PCT application.

* cited by examiner

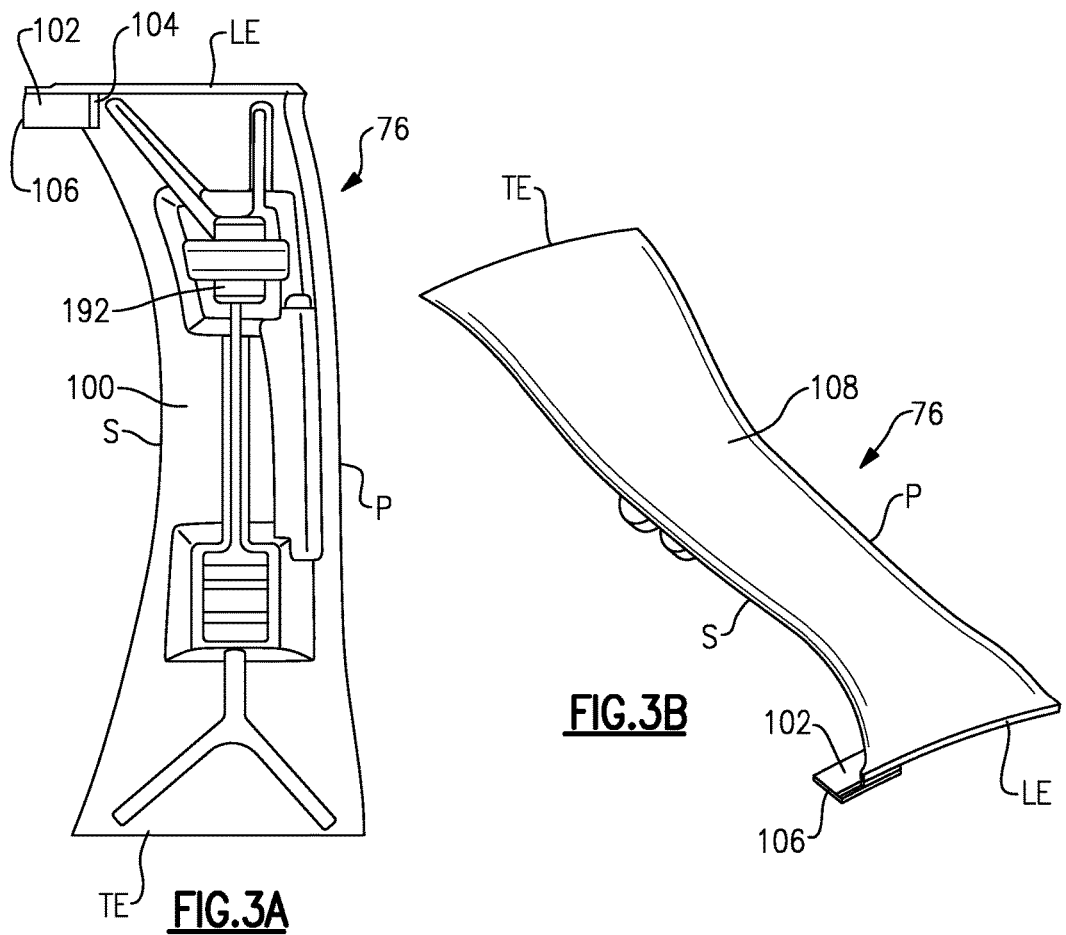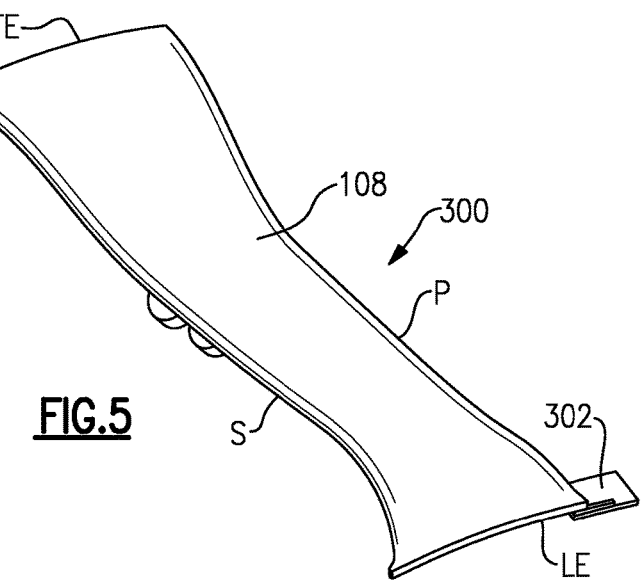

FAN PLATFORM WITH LEADING EDGE TAB

CROSS-REFERENCE TO RELATED APPLICATION

This application claims priority to U.S. Provisional Application No. 61/879,254, filed Sep. 18, 2013.

BACKGROUND

This application relates to a tab on a fan platform which interfaces with an undersurface of a circumferentially adjacent platform.

Gas turbine engines are known and, typically, include a fan delivering air into a compressor section. The air is compressed and delivered into a combustion section where it is mixed with fuel and ignited. Products of this combustion pass downstream over turbine rotors driving them to rotate.

In gas turbine engines, the flow of air across the fan section is of paramount importance. Thus, a good deal of design is included. Further, recently, fan rotors have been driven by a gear reduction, and with this change, the outer diameter of fan blades has increased dramatically.

There are a number of forces on the fan rotor, and the blades. Further, it becomes important to provide as smooth an air flow path across the rotor as is possible. Thus, platforms have been included pivotally mounted to a rotor body, and circumferentially intermediate the fan blades. The platforms extend from a leading edge to a trailing edge and from a pressure wall to a suction wall.

During engine operation, the platforms can twist under the influence of various forces. As an example, there can be twisting about a pivot axis of the platforms. The platforms are made relatively thin and due to circumferential loads, rigid body motion and twisting, it is possible for the platforms to create a scoop at the leading edge between the spinner and platform. Also, twisting will change the flow path profile of the platform and effect aerodynamic performance.

SUMMARY

In a featured embodiment, a platform for a gas turbine engine has an outer surface and an inner surface. The inner surface is provided with a mount location for mounting the platform to a rotor. The platform extends from a leading edge to a trailing edge, and between a suction wall and a pressure wall. A circumferential direction is defined between the suction wall and the pressure wall. A tab extend circumferentially outward of one of the suction and pressure walls from the platform. The tab has a circumferentially outermost portion which will abut an inner surface of an adjacent platform when the platform is mounted.

In another embodiment according to the previous embodiment, the tab is mounted to the inner surface of the platform.

In another embodiment according to any of the previous embodiments, the tab extends circumferentially outward of the suction wall of the platform.

In another embodiment according to any of the previous embodiments, the tab is mounted adjacent the leading edge of the platform.

In another embodiment according to any of the previous embodiments, the tab extends circumferentially outward of the suction wall of the platform.

In another embodiment according to any of the previous embodiments, the tab is mounted adjacent the leading edge of the platform.

In another embodiment according to any of the previous embodiments, the tab extends circumferentially outward of the pressure wall of the platform.

In another embodiment according to any of the previous embodiments, the tab is mounted adjacent the leading edge of the platform.

In another embodiment according to any of the previous embodiments, the tab and the platform are integrally molded.

In another embodiment according to any of the previous embodiments, the platform is to be mounted to a fan rotor.

In another featured embodiment, a fan section of a gas turbine engine has a fan rotor with a plurality of grooves receiving dovetails from a plurality of circumferentially spaced fan blades. A plurality of platforms are mounted circumferentially intermediate the plurality of the fan blades. The platforms include an outer surface and an inner surface. The inner surface has a mount location mounting the platforms to the fan rotor. Each of the platforms extend from a leading edge to a trailing edge, and between a suction wall and a pressure wall. A circumferential direction is defined between the suction wall and the pressure wall. Tabs extend circumferentially outward of one of the suction and pressure walls from the platforms, and have a circumferentially outermost portion which abuts an inner surface of an adjacent one of the platforms.

In another embodiment according to the previous embodiment, the tab is mounted to the inner surface of the platform.

In another embodiment according to any of the previous embodiments, the tab extends circumferentially outward of the suction wall of the platform.

In another embodiment according to any of the previous embodiments, the tab is mounted adjacent the leading edge of the platform.

In another embodiment according to any of the previous embodiments, the tab extends circumferentially outward of the suction wall of the platform.

In another embodiment according to any of the previous embodiments, the tab is mounted adjacent the leading edge of the platform.

In another embodiment according to any of the previous embodiments, the tab extends circumferentially outward of the pressure wall of the platform.

In another embodiment according to any of the previous embodiments, the tab is mounted adjacent the leading edge of the platform.

In another embodiment according to any of the previous embodiments, the tab and the platform are integrally molded.

In another featured embodiment, a gas turbine engine has a fan section, a compressor section, and a turbine section. The fan section has a fan rotor with a plurality of grooves receiving dovetails from a plurality of circumferentially spaced fan blades. A plurality of platforms are mounted circumferentially intermediate the plurality of the fan blades. The platforms include an outer surface and an inner surface. The inner surface has a mount location mounting the platforms to the rotor. The platforms extend from a leading edge to a trailing edge, and between a suction wall and a pressure wall. A circumferential direction is defined between the suction wall and the pressure wall. Tabs extend circumferentially outward of one of the suction and pressure walls from the platforms. The tabs have a circumferentially outermost portion which abuts an inner surface of an adjacent one of the platforms.

These and other features may be best understood from the following drawings and specification.

BRIEF DESCRIPTION OF THE DRAWINGS

FIG. 3A shows an underside of a platform.
FIG. 3B shows an outer flow side of the FIG. 3A platform.
FIG. 5 shows an alternative.

DETAILED DESCRIPTION

Figure 1:
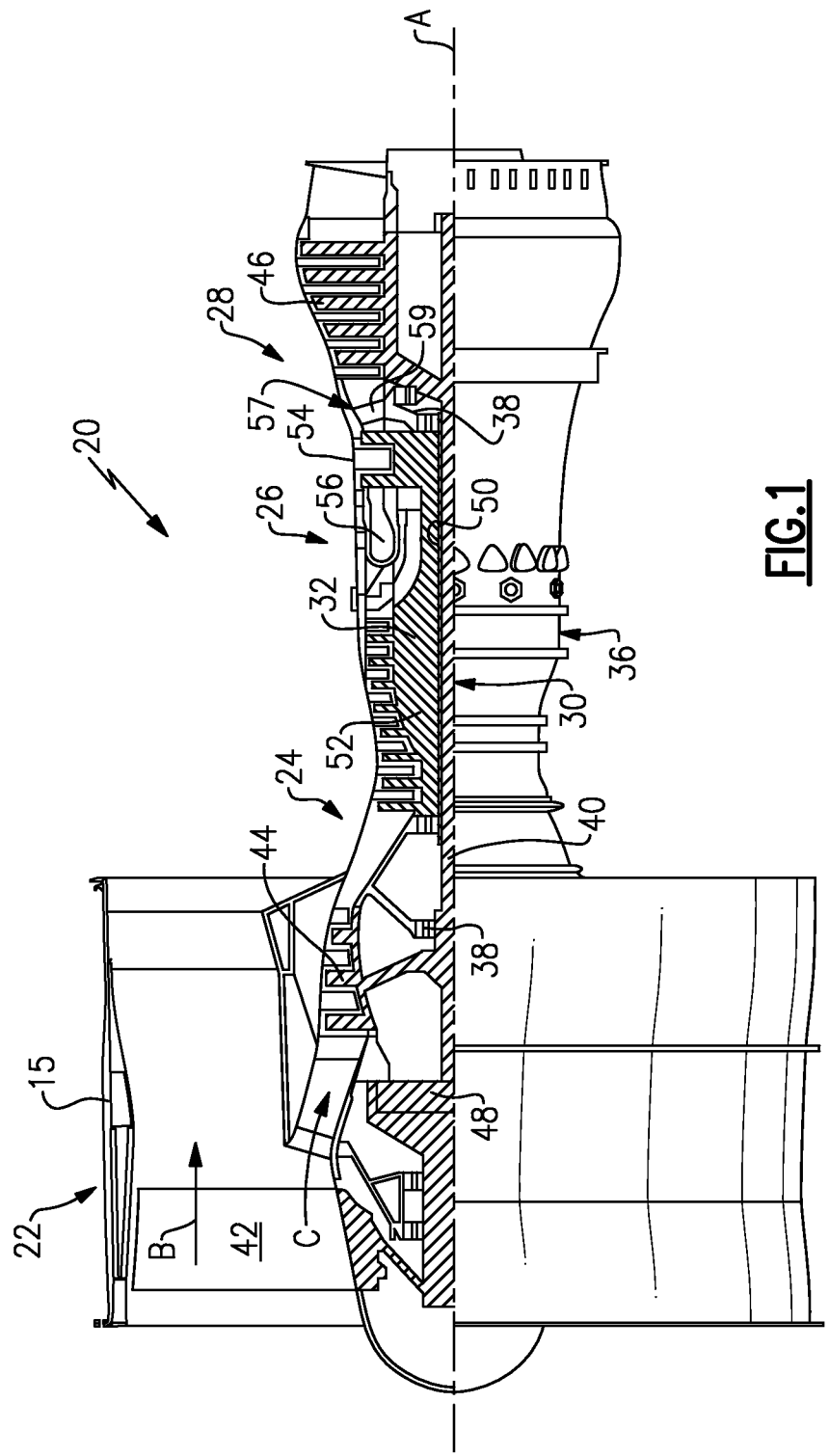
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°\text{ R})/(518.7° \text{ R})]^{0.5}$. The "Low corrected fan tip speed" as disclosed herein according to one non-limiting embodiment is less than about 1150 ft/second.

Figure 2:
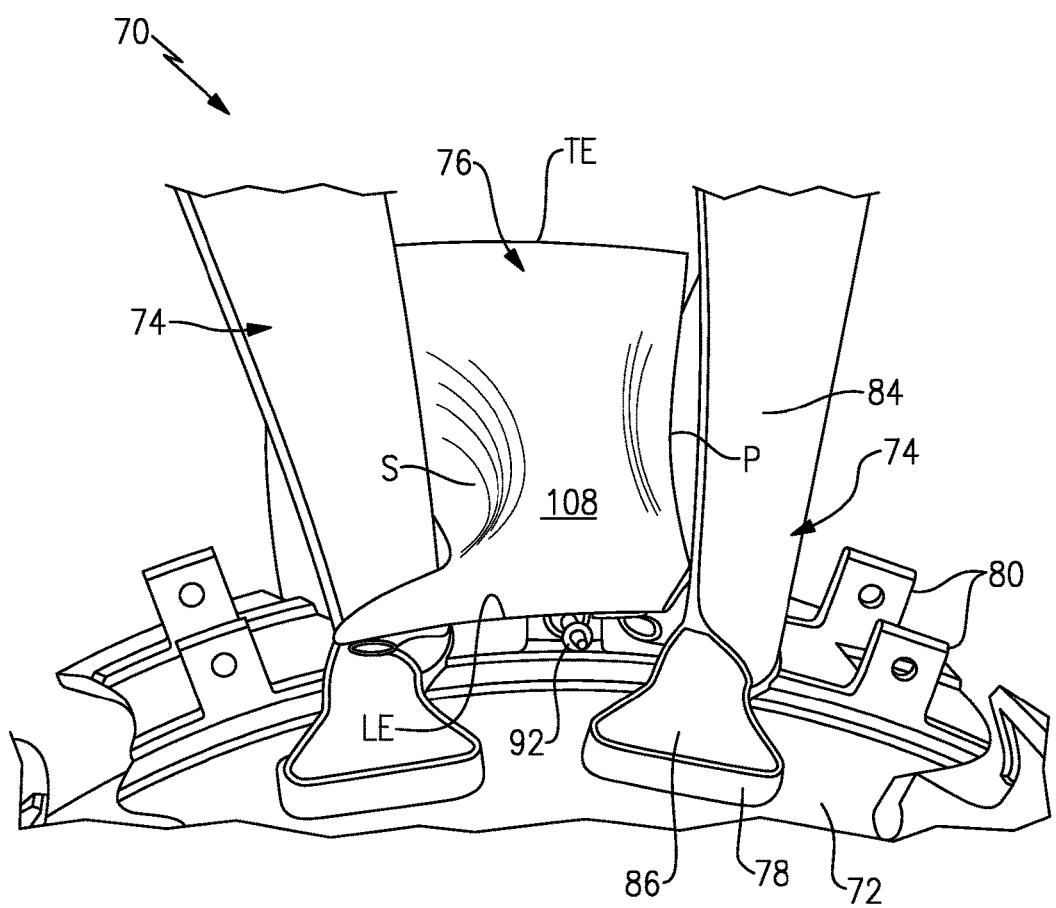
FIG. 2 shows a detail of a fan.

FIG. 2 shows a fan 70 incorporating a fan rotor 72 having a plurality of grooves 78 which receive dovetails 86 from fan blades 74 each having an airfoil 84. As shown, there are platforms 76 extending circumferentially intermediate adjacent fan blades 74. The platforms 76 have an outer surface 108 that provides a relatively smooth flow path for the air flow as shown above with regard to FIG. 1. The platforms 76 extends from a leading edge LE to a trailing edge TE and between a suction wall S and a pressure wall P. A circumferential direction can be defined between the walls P and S.

Mounting brackets 80 receive pins 92 to mount the platform 76. The platforms 76 may pivot about the brackets 80 during operation. As mentioned, in the prior art, there may be gaps between platforms 76 if they pivot during operation.

Thus, FIG. 3A shows a tab 102 mounted at the leading edge LE and on the suction side S of a platform 76. FIG. 3A shows a mount location 192 for receiving the pin 92 and securing the platform 76 to the brackets 80, as known. This view is of an underside or inner surface 100, and includes various stiffening structure, as known.

As shown in FIG. 3B, the tab 102 extends circumferentially outward away from the suction side S to an outer end 106. FIG. 3B shows an outer face 108 which provides an air flow path. As shown in FIG. 3A, an inner end 104 is secured to the inner face 100.

Figure 4:
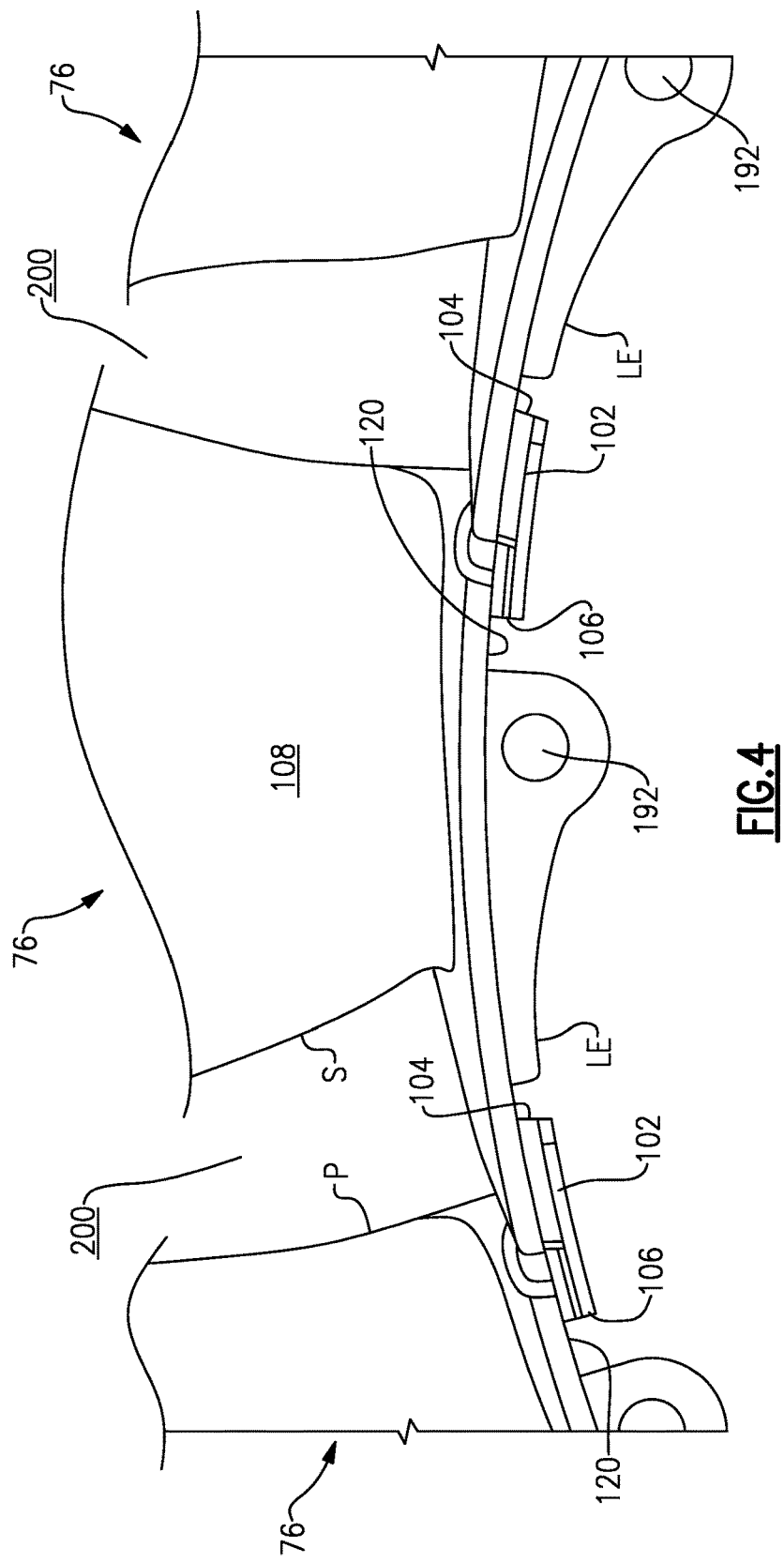
FIG. 4 shows an assembly view from a forward location looking aft.

Now, when the platforms 76 are assembled adjacent to each other, as shown in FIG. 4, tabs 102 extend circumferentially outwardly to the outer end 106. Outer end 106 abuts an underside 120 at the pressure side of an adjacent platform section 76. As each platform 76 pivots and twists during operation, and say clockwise in the FIG. 4 view, this will force the tab 102 outer end 106 against the underside 120 and resist movement of the circumferentially adjacent platform 76.

Thus, in combination, the tabs 102 ensure the assembly of platforms 76 will remain closer to cylindrical at the leading edge LE and will, thus, result in a controlled flow surface for air. As shown in FIG. 4, there will be fan blades mounted within spaces 200, as can also be appreciated from FIG. 2. As is also clear from FIGS. 3A-3C, there is no tab at the trailing edge. Thus, the tab at the leading edge will ensure there is no gap at the leading edge, where the leakage will occur. If there were tabs at the trailing edge, such could result in contact, that would prevent the tab 102/302 at the leading edge from performing its function.

FIG. 5 shows an alternative embodiment, wherein a platform 300 has a tab 302 extending from an underside, and at the leading edge LE, and extending circumferentially away from the pressure side P. If the pressure side is the area which needs control, this embodiment would be utilized, rather than the embodiment of FIG. 3B.

In one embodiment, the tabs may be integrally molded with the platforms 76. The platform and tabs may be molded from a carbon composite material, although other materials may be utilized.

Although the platform is disclosed for use in a fan section of a gas turbine engine, it may have application in a compressor or turbine section.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A platform for a gas turbine engine comprising:
an outer surface and an inner surface, said inner surface being provided with a mount location for mounting said platform to a rotor, and said platform extending from a leading edge to a trailing edge, and between a suction wall and a pressure wall, and a circumferential direction being defined between said suction wall and said pressure wall; and
a tab extending circumferentially outward of one of said suction and pressure walls from said platform, and said tab having a circumferentially outermost portion which will abut an inner surface of an adjacent platform when said platform is mounted, said tab being formed at said leading edge, with no tab being formed at said trailing edge.

2. The platform as set forth in claim 1, wherein said tab is mounted to said inner surface of said platform.

3. The platform as set forth in claim 2, wherein said tab extends circumferentially outward of said suction wall of said platform.

4. The platform as set forth in claim 3, wherein said tab is mounted adjacent said leading edge of said platform.

5. The platform as set forth in claim 1, wherein said tab extends circumferentially outward of said suction wall of said platform.

6. The platform as set forth in claim 5, wherein said tab is mounted adjacent said leading edge of said platform.

7. The platform as set forth in claim 1, wherein said tab extends circumferentially outward of said pressure wall of said platform.

8. The platform as set forth in claim 7, wherein said tab is mounted adjacent said leading edge of said platform.

9. The platform as set forth in claim 1, wherein said tab and said platform are integrally molded.

10. The platform as set forth in claim 1, wherein said platform is to be mounted to a fan rotor.

11. A fan section of a gas turbine engine comprising:
a fan rotor having a plurality of grooves receiving dovetails from a plurality of circumferentially spaced fan blades;
a plurality of platforms mounted circumferentially intermediate said plurality of said fan blades;
the platforms including an outer surface and an inner surface, said inner surface having a mount location mounting said platforms to said fan rotor, and each of said platforms extending from a leading edge to a trailing edge, and between a suction wall and a pressure wall, and a circumferential direction being defined between said suction wall and said pressure wall; and
tabs extending circumferentially outward of one of said suction and pressure walls from said platforms, and said tabs having a circumferentially outermost portion which abuts an inner surface of an adjacent one of said platforms, said tabs being formed at said leading edge, with no tab being formed at said trailing edge.

12. The fan section as set forth in claim 11, wherein said tab is mounted to said inner surface of said platform.

13. The fan section as set forth in claim 12, wherein said tab extends circumferentially outward of said suction wall of said platform.

14. The fan section as set forth in claim 13, wherein said tab is mounted adjacent said leading edge of said platform.

15. The fan section as set forth in claim 11, wherein said tab extends circumferentially outward of said suction wall of said platform.

16. The fan section as set forth in claim 15, wherein said tab is mounted adjacent said leading edge of said platform.

17. The fan section as set forth in claim 11, wherein said tab extends circumferentially outward of said pressure wall of said platform.

18. The fan section as set forth in claim 17, wherein said tab is mounted adjacent said leading edge of said platform.

19. The fan section as set forth in claim 11, wherein said tab and said platform are integrally molded.

20. A gas turbine engine comprising:
a fan section, a compressor section, and a turbine section;
the fan section having a fan rotor with a plurality of grooves receiving dovetails from a plurality of circumferentially spaced fan blades, a plurality of platforms mounted circumferentially intermediate said plurality of said fan blades, the platforms including an outer surface and an inner surface, said inner surface having a mount location mounting said platforms to said rotor, and said platforms extending from a leading edge to a trailing edge, and between a suction wall and a pressure wall, and a circumferential direction being defined between said suction wall and said pressure wall; and tabs extending circumferentially outward of one of said suction and pressure walls from said platforms, and said tabs having a circumferentially outermost portion which abuts an inner surface of an adjacent one of said platforms, said tabs being formed at said leading edge, with no tab being formed at said trailing edge.

\* \* \* \* \*